United States Patent [19]

Creighton et al.

[11] Patent Number: 5,192,734
[45] Date of Patent: Mar. 9, 1993

[54] HYDROPROCESSING CATALYST COMPOSITION

[75] Inventors: John E. Creighton, Columbia; Leo Rheaume, Hyattsville, both of Md.

[73] Assignee: W. R. Grace & Co.- Conn., New York, N.Y.

[21] Appl. No.: 783,067

[22] Filed: Oct. 25, 1991

[51] Int. Cl.$^5$ .................. B01J 21/04; B01J 23/85; B01J 23/88

[52] U.S. Cl. .................. 502/314; 502/320; 502/322; 502/323; 502/332; 502/335; 502/336

[58] Field of Search ............. 502/314, 320, 322, 323, 502/332, 335, 336

[56] References Cited

U.S. PATENT DOCUMENTS

| | | | |
|---|---|---|---|
| 3,383,301 | 5/1968 | Beuther et al. | 502/314 X |
| 3,622,500 | 11/1971 | Alpert et al. | 208/111 |
| 3,692,698 | 9/1972 | Riley et al. | 252/439 |
| 3,770,617 | 11/1973 | Riley et al. | 208/216 |
| 3,876,523 | 4/1975 | Rosinski et al. | 208/89 |
| 4,048,060 | 9/1977 | Riley | 208/210 |
| 4,051,021 | 9/1977 | Hamner | 208/216 |
| 4,066,574 | 1/1978 | Tamm | 252/439 |
| 4,082,695 | 4/1978 | Rosinski et al. | 252/465 |
| 4,089,774 | 5/1978 | Oleck et al. | 208/89 |
| 4,113,661 | 9/1978 | Tamm | 252/465 |
| 4,179,411 | 12/1979 | Broersma et al. | 502/314 X |
| 4,297,242 | 10/1981 | Hensley, Jr. et al. | 252/439 |
| 4,306,965 | 12/1981 | Hensley, Jr. et al. | 208/216 PP |
| 4,309,278 | 1/1982 | Sawyer | 208/111 |
| 4,328,127 | 5/1982 | Angevine et al. | 252/439 |
| 4,341,625 | 7/1982 | Tamm | 208/216 PP |
| 4,395,328 | 7/1983 | Hensley, Jr. et al. | 208/251 H |
| 4,648,963 | 3/1987 | Kutes et al. | 208/216 R |
| 4,652,545 | 3/1987 | Lindsley et al. | 502/255 |
| 4,729,826 | 3/1988 | Lindsay et al. | 208/211 |
| 4,732,886 | 3/1988 | Tomino et al. | 502/314 |
| 4,746,419 | 5/1988 | Peck et al. | 208/213 |
| 4,941,964 | 7/1990 | Dai et al. | 208/216 PP |
| 4,945,079 | 7/1990 | Pedersen et al. | 502/314 |
| 4,981,832 | 1/1991 | Tawara et al. | 502/314 |
| 5,009,771 | 4/1991 | Clark et al. | 208/216 PP |

*Primary Examiner*—W. J. Shine
*Attorney, Agent, or Firm*—Arthur P. Savage

[57] ABSTRACT

Hydroprocessing catalysts which comprise alumina and Group VIB and VIII metal components having a desired pore size/volume distribution and high surface area, i.e. above 330 m$^2$/g.

5 Claims, 9 Drawing Sheets

HYDROPROCESSING CATALYST COMPOSITION

The present invention relates to improved hydroprocessing catalysts, and in particular to alumina-Group VIB/VIII metal catalysts that are used in the hydrocracking(HC)/hydrodesulfurization(HDS)/hydrodenitrogenation(HDN) and hydrodemetallization(HDM) of heavy hydrocarbon feedstocks that contain high levels of asphaltenes, sulfur, nitrogen and metal compounds as well as Conradson Carbon.

Many alumina supported Group VIB/VIII metal containing catalysts have been developed for the hydroprocessing of hydrocarbons. References which disclose a wide variety of hydroprocessing catalysts are as follow:

U.S. Pat. No. 3,622,500
U.S. Pat. No. 3,692,698
U.S. Pat. No. 3,770,617
U.S. Pat. No. 3,876,523
U.S. Pat. No. 4,048,060
U.S. Pat. No. 4,051,021
U.S. Pat. No. 4,066,574
U.S. Pat. No. 4,082,695
U.S. Pat. No. 4,089,774
U.S. Pat. No. 4,113,661
U.S. Pat. No. 4,297,242
U.S. Pat. No. 4,306,965
U.S. Pat. No. 4,309,278
U.S. Pat. No. 4,328,127
U.S. Pat. No. 4,341,625
U.S. Pat. No. 4,395,328
U.S. Pat. No. 4,648,963
U.S. Pat. No. 4,652,545
U.S. Pat. No. 4,729,826
U.S. Pat. No. 4,732,886
U.S. Pat. No. 4,746,419
U.S. Pat. No. 4,941,964
U.S. Pat. No. 4,945,079
U.S. Pat. No. 4,981,832
U.S. Pat. No. 5,009,771

The above-noted references disclose hydroprocessing catalysts which possess pore volume and pore size distribution characteristics that optimize the performance of the catalysts in various hydroprocessing operations, including HC, HDS, HDM and HDN.

While prior art catalysts having specific pore volume/pore size distribution characteristics are effective for the hydroprocessing of various high molecular weight hydrocarbon feedstocks, it is observed that catalysts which are effective for the processing of feedstocks that contain large quantities of asphaltenes frequently include a macro-pore structure that permits the entry of deactivating metal compounds. In addition, catalysts which are used in the ebullating bed hydrocracking of residual hydrocarbons should possess a high surface area that provides a maximum reactive surface for a given volume of catalyst.

It is therefore an object of the present invention to provide improved alumina supported, Group VIB/VIII metal containing hydroprocessing catalysts.

It is a further object to provide hydroprocessing catalysts which combine a desired pore volume/pore size distribution with high surface area.

It is a further object to provide a hydroprocessing catalyst which is particularly useful for the HC, HDS, HDM and HDN of residual hydrocarbon feedstocks that contain large quantities of asphaltenes.

BRIEF DESCRIPTION OF THE DRAWINGS

These and still further objects of our invention shall be readily apparent to one skilled-in-the-art from the following detailed description, specific examples and drawings: wherein the FIGS. 1 to 9 are graphic representations of data which illustrate the Conversion, Conradson Carbon Reduction, Sulfur Reduction, Nitrogen Reduction and Ni & V Reduction capabilities of catalysts of the present invention.

Broadly, our invention contemplates hydroprocessing catalysts which comprise an alumina support and effective amounts of Group VIB and/or Group VIII metals, wherein the catalyst is characterized by a high surface area, and a pore structure in which the pore volume in pores greater than 250 Å diameter is less than 0.25 cc/g.

Figure 1:
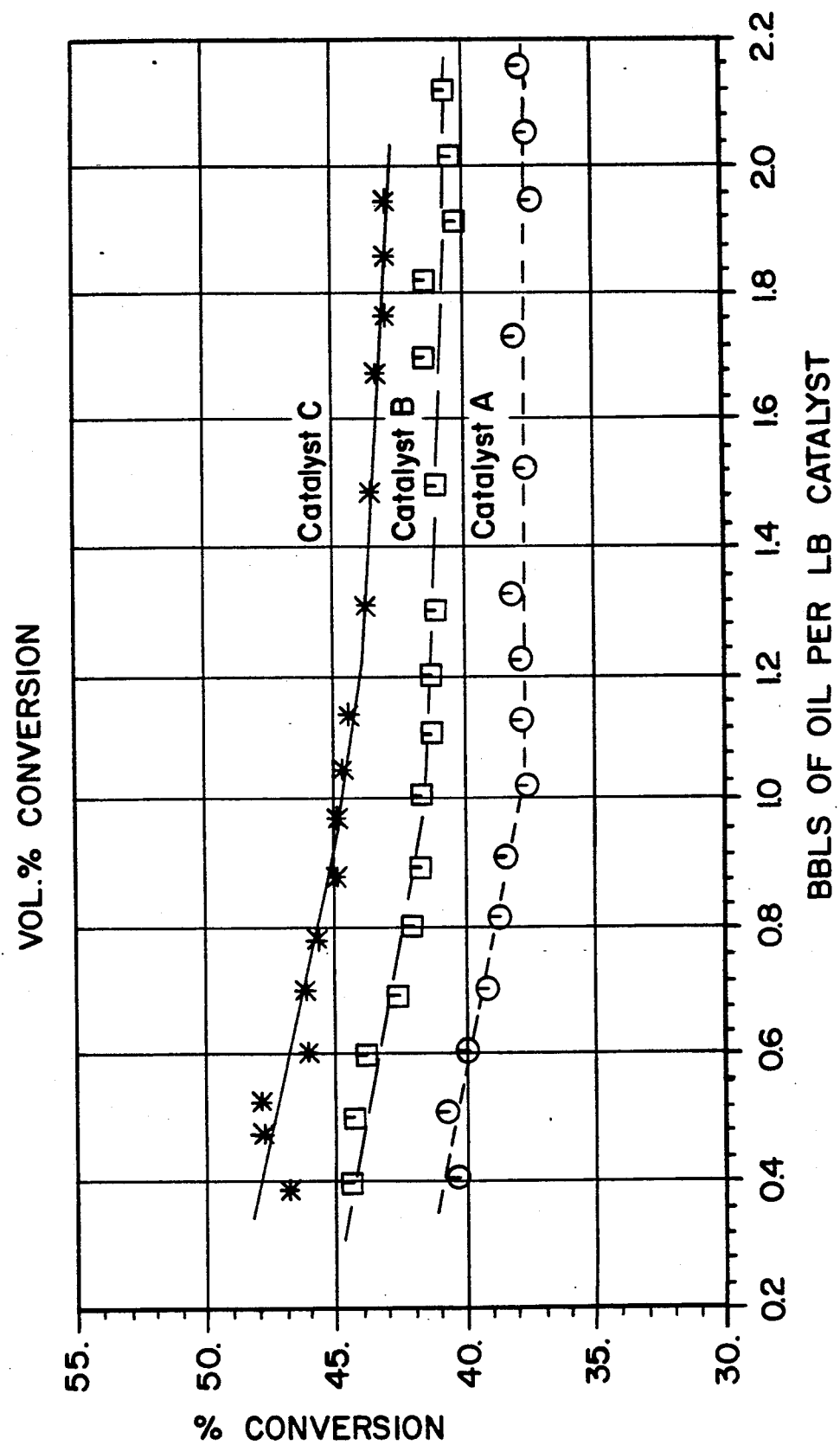

More specifically, we have invented an improved hydroprocessing catalyst which is particularly active for the HC, HDS, HDN and HDM of heavy residual hydrocarbon feedstocks which comprises an alumina support having about 5 to 25 weight percent and preferably 12 to 15 weight percent Group VIB metal (preferably W or Mo) and 0 to 10 weight percent and preferably 3 to 5 weight percent Group VIII metal (preferably Ni or Co), expressed as the oxides, wherein the catalyst is particularly characterized by a surface area of above about 330 $m^2/g$, and preferably 330 to 380 $m^2/g$; a total pore volume above about 0.5 cc/g, and preferably 0.6 to 0.9 cc/g as determined by mercury porosimetry in pores above 30 Å diameter up to about 300,000 Å diameter; and a pore size distribution wherein the pore volume in pores greater than 250 Å is less than 0.25 cc/g, and preferably 0.01 to 0.25 cc/g.

The catalysts of the present invention are prepared as follows:

1) A particulate alumina powder is thoroughly mixed with about 7 to 22 weight percent water, or preferably a dilute aqueous solution of nitric acid which contains 0.5 to 3.0 weight percent $HNO_3$.

2) The mixture is then combined with the desired quantity of Group VIB and Group VIII metal salt solutions such as ammonium dimolybdate and nickel nitrate.

3) The metal containing alumina mixture which contains from about 50 to 56 weight percent moisture is then formed into catalyst particles having a desired shape and size, preferably by extrusion.

4) The formed catalyst particles are dried at a temperature of about 110° to 150° C., and then calcined at a temperature of 500° to 600° C. for about one to two hours.

The particulate alumina powder used in the practice of our invention is commercially available from the Davison Chemical Division of W. R. Grace & Co.-Conn. as Grade SRA-46 HR. The preferred alumina has an average particulate size of about 15 to 25 μm, an X-ray diffraction pattern which indicates the presence of pseudoboehmite and the absence of Beta alumina trihydrate. The aluminas may be obtained by reacting aqueous solutions of sodium aluminate and alumina sulfate in accordance with the teachings of U.S. Pat. No. 4,154,812.

The catalysts of our invention typically have a density of about 0.8 to 1.1 g/cc and a particle diameter of about 0.8 to 1.6 mm. These catalysts may be used in the hydroprocessing of hydrocarbon feedstocks at temperatures of 350° to 500° C., pressures of 80 to 200 atm, $H_2$ consumption of 500 to 5000 standard cubic feet per barrel, using catalyst/feed weight ratios of 0.2 to 1.8.

Having described the basic aspects of our invention, the following Examples are set forth to illustrate specific embodiments thereof.

EXAMPLE 1

This example describes the preparation of three catalysts of the present invention (Catalysts B, C & D), and a comparison prior art catalyst (Catalyst A).

Catalysts B, C, & D are made using the same equipment and similar process steps. Thirty lb. of pseudo-boehmite alumina powder (Davison Chemical Grade SRA 46R) were loaded into an R-7 model Eirich mixer. 2600 and 1820 g respectively of water were mixed with 34 g of nitric acid for catalysts C and D. Catalyst B was made using 1820 g of water and no nitric acid.

The mixture was mixed for 3 minutes on low speed. An ammonium dimolybdate solution was prepared by dissolving 1900 g of ammonium dimolybdate crystals into 4400 g of 120° F. deionized water. The 6300 g of this 25.3 wt. % (as $MoO_3$) ammonium dimolybdate solution were added to the mixer and mixed for 2 minutes on low. Commercial nickel nitrate solution was diluted with water to 1.33 specific gravity (13.0 wt. % NiO). 3120 g of this diluted nickel nitrate solution were added to the mixer and mixed 2 minutes on low. The mixer was run for a final mix cycle on a high setting for 5 minutes.

The resulting mixed powder was extruded through a 4" Bonnot single auger type extruder. A die with nominal 1/32" holes was used to form the catalysts.

Following extrusion the formed catalysts were dried overnight in a Proctor and Schwartz static tray dryer at about 250° F. The finished catalyst was calcined in a muffle furnace at 1000° F bed temperature for 2 hours.

Comparison catalyst A, was prepared by a similar procedure used for the preparation of catalysts B, C & D with the following differences: (1) Davison Chemical pseudoboehmite alumina powder Grade VFA was used; (2) no acid was added to the water; and (3) water and ammonium dimolybdate solution were added together with no mix cycle in between their additions.

The chemical and physical properties of SRA 46HR and VFA alumina powder are set forth in Table I(a) below:

TABLE I (a)

| Properties of Alumina Powders | SRA 46HR | VFA |
|---|---|---|
| Chemical: | | |
| $Al_2O_3$ (wt. %) | >99.5 | >99.5 |
| $H_2O$ (wt. %) | 28 | 28 |
| $Na_2O$ (wt. %) | 0.08 | 0.10 |
| $SO_4$ (wt. %) | 0.3 | 0.3 |
| Physical: | | |
| Average Particle Size ($\mu$) | 18 | 18 |
| Surface Area ($m^2/g$) | 300 | 330 |
| *Total Pore Volume (cc/g) | 0.92 | 0.90 |
| Pore Volume > 250 Å (cc/g) | 0.20 | 0.30 |
| X-Ray Diffraction: | | |
| 100% Alpha Alumina Monohydrate (pseudoboehmite) | | |

*As determined by mercury porisimetry in pores 30 to 1500 Å diameter.

The properties of Catalysts A, B, C and D are set forth in Table I(b).

TABLE I (b)

| CATALYST PROPERTIES | Catalyst A | Catalyst B | Catalyst C | Catalyst D |
|---|---|---|---|---|
| Total Volatiles at 1000° F. | 2.9 | 1.8 | 2.3 | 5.3 |
| Chemical: Wt. % Dry Basis | | | | |
| $MoO_3$: | 13.3 | 14.0 | 13.1 | 13.1 |
| NiO: | 3.2 | 3.4 | 3.8 | 3.9 |
| BET Surface Area: ($m^2/g$) | 317 | 357 | 339 | 352 |
| Hg PV: (cc/g) | | | | |
| Total | 0.79 | 0.79 | 0.65 | 0.61 |
| >250 Å | 0.29 | 0.22 | 0.10 | 0.04 |

EXAMPLE 2

The test procedures and conditions used to evaluate Catalysts A, B, C & D were as follows:

1. 75 cc of catalyst is charged to the reactor.
2. The catalyst is heated to 300° F. in nitrogen.
3. At 300° F., the nitrogen is replaced with a gas consisting of 6 vol % $H_2S$ and 94 vol % $H_2$, at a pressure of one atmosphere and at a flow rate of 30 liters per hour. After 3 hours at 300° F., the temperature is raised to 600° F. over a 3 hour period.
4. At 600° F., the 6% $H_2S/94\%$ $H_2$ gas is replaced with 100% $H_2$, and the unit is pressured with $H_2$ to 2000 psig. The $H_2$ flow rate is set at 3000 SCF/bbl of feedstock when operating at a Liquid Hourly Space Velocity (LHSV) of 0.5, and set at 4800 SCF/bbl of feedstock when operating at a LHSV of 0.8.
5. The catalyst bed temperature is raised to a temperature 50° F. below the desired operating temperature. The feedstock described in Table I(c) is then introduced at a rate of 0.5 LHSV or 0.8 LHSV.

TABLE I (c)

| | |
|---|---|
| API Gravity | 4.5 |
| Amount boiling above 1000° F. (538° C.) (vol. %) | 91 |
| Conradson Carbon Residue (wt. %) | 23.0 |
| Nitrogen (wt. %) | 0.45 |
| Sulfur (wt. %) | 5.5 |
| Nickel + Vanadium (ppm) | 206 |
| Pentane Insolubles (wt. %) | 26.6 |
| Toluene Insolubles (wt. %) | 0.05 |

6. After 24 hours on feedstock, the temperature is raised to the desired operating temperature.
7. The liquid product is collected periodically and analyzed to determine the following:

$$\text{Vol \% Conversion} = \left[\frac{\text{Vol \% of feedstock boiling above 1000° F.} - \text{Vol \% of product boiling above 1000° F.}}{\text{Vol \% of feedstock boiling above 1000° F.}}\right] \times 100$$

$$\text{Wt. \% Conradson Carbon Reduction} = \left[\frac{\text{Wt \% Conradson carbon residue in feedstock} - \text{wt \% Conradson Carbon residue in product}}{\text{Wt \% Conradson carbon residue in feedstock}}\right] \times 100$$

$$\text{Wt. \% Sulfur Reduction} = \left[\frac{\text{Wt \% Sulfur in feedstock} - \text{Wt \% sulfur in product}}{\text{Wt \% Sulfur in feedstock}}\right] \times 100$$

-continued $$\begin{bmatrix} \text{Wt. \% Ni + V} \\ \text{Reduction} \end{bmatrix} = \frac{(\text{Wt \% Ni + V in feedstock} - \text{WT \% Ni + V in product})}{\text{Wt \% Ni + V in feedstock}} \times 100$$

$$\begin{bmatrix} \text{Wt. \%} \\ \text{Nitrogen Reduction} \end{bmatrix} = \frac{(\text{Wt \% Nitrogen in feedstock} - \text{Wt \% Nitrogen in product})}{\text{Wt \% Nitrogen in feedstock}} \times 100$$

EXAMPLE 3

The test procedure described in Example 2 was used to test catalysts A, B and C, described in Example No. 1.

Catalysts A, B and C were tested at a temperature of 800° F. and a liquid hourly space velocity of 0.8. The test runs were carried out for a total of 22 days so that the catalysts would be subjected to about 2.0 barrels of feedstock per pound of catalyst.

The test results show that as the macropore volume (volume in pores greater than 250 Å) decreases from Catalyst A to Catalyst B to Catalyst C, the activity of the catalysts increases for % Conversion, % Conradson carbon reduction, % Sulfur reduction, and % Nitrogen reduction. For Ni+V reduction, the activity increases from Catalyst A to Catalyst B, but then decreases for Catalyst C.

Figure 2:
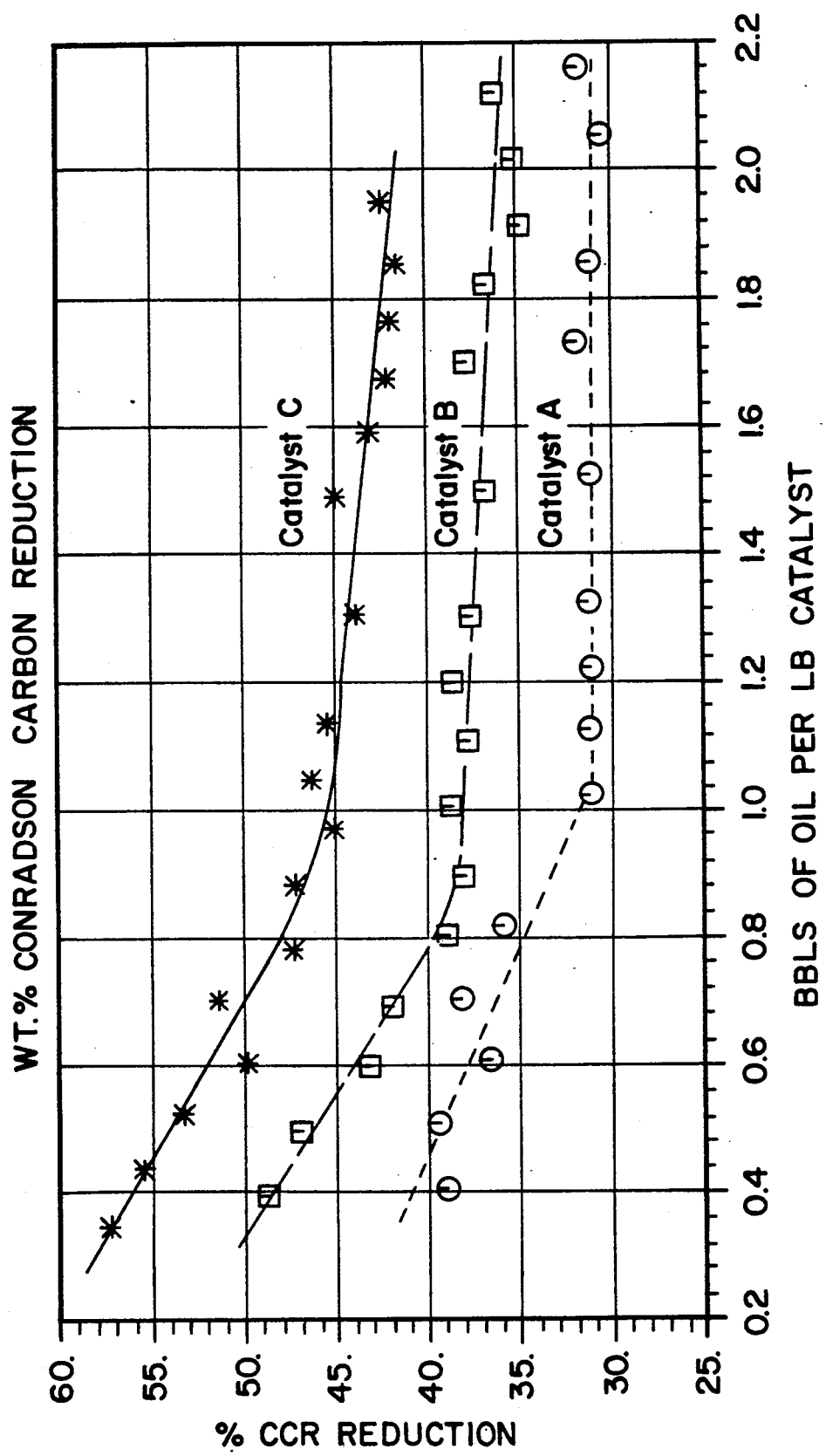
Figure 3:
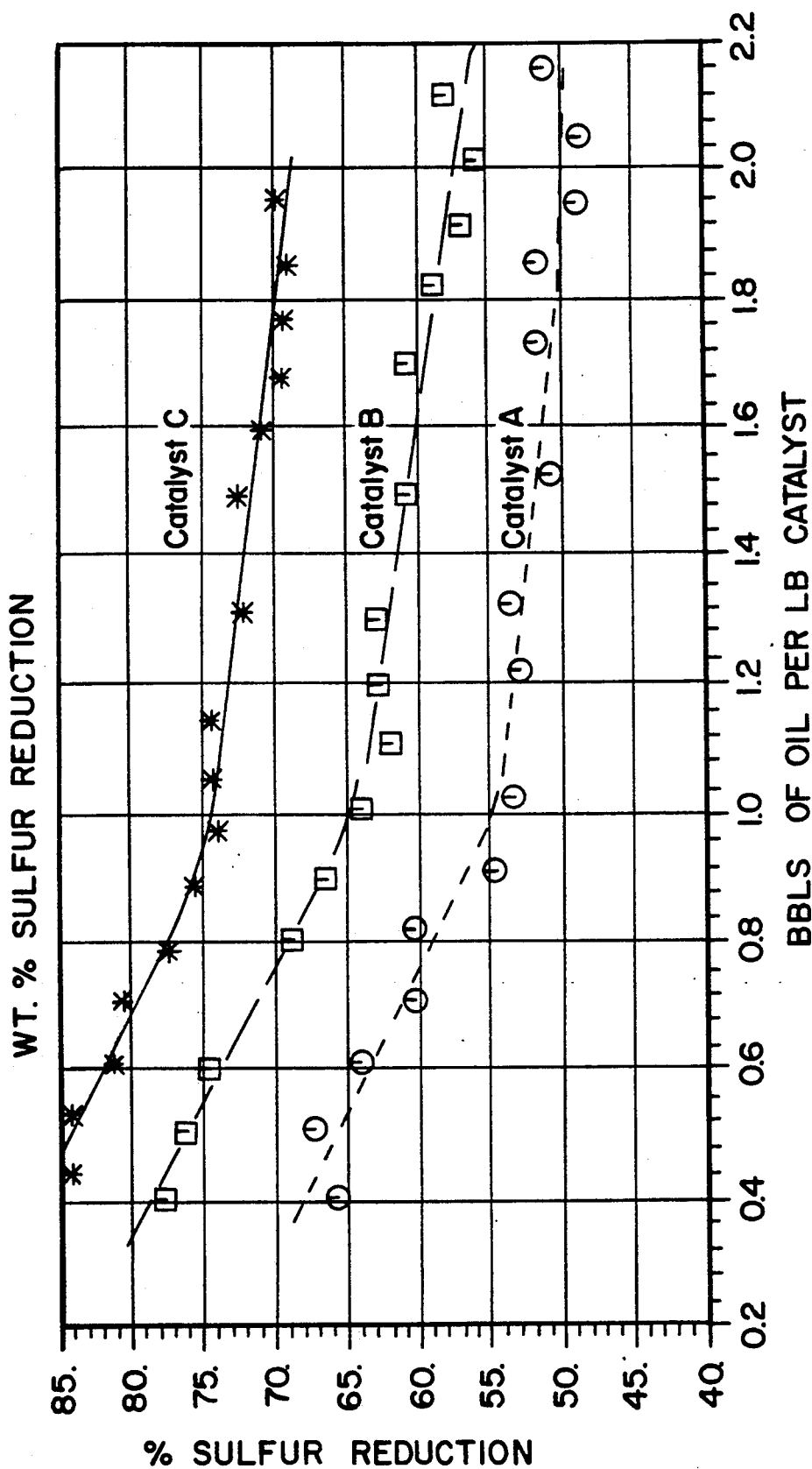
Figure 4:
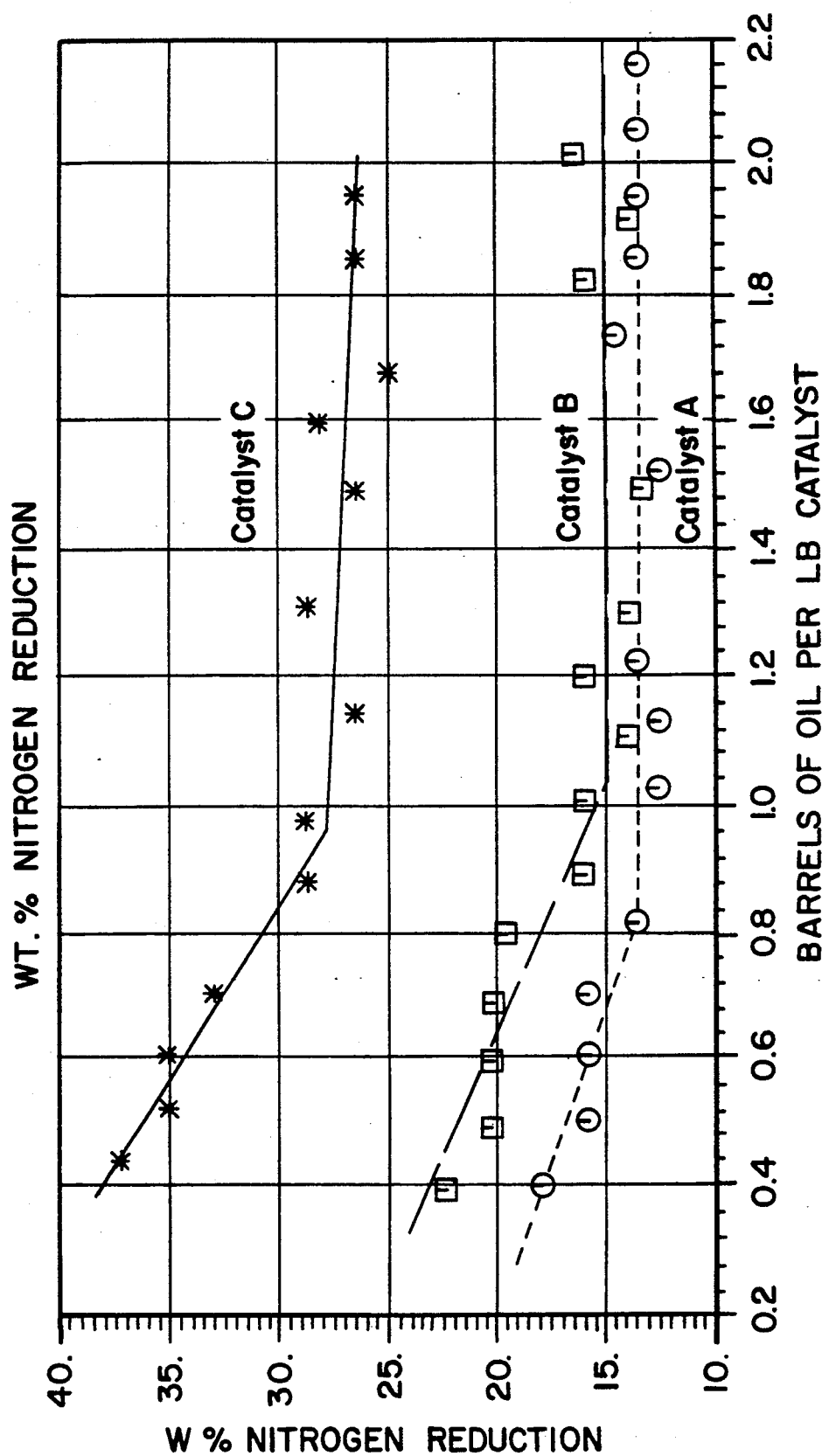
Figure 5:
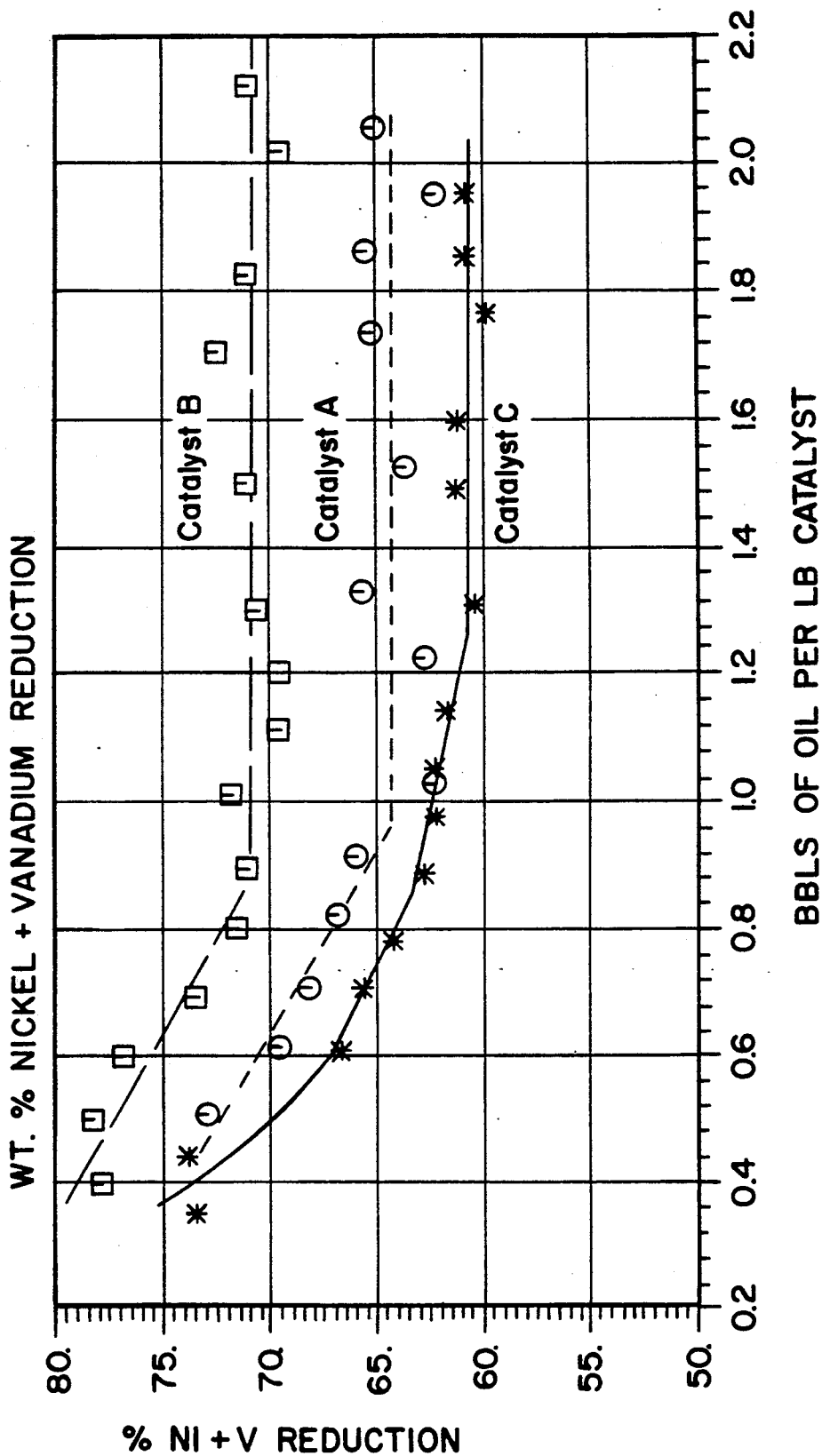

The test results are shown in FIGS. 1 through 5 as a function of barrels of oil (feedstock) per pound of catalyst. Additionally, the data in FIGS. 1 through 5 were averaged for the range of 0.4 to 2.0 barrels of oil (feedstock) per pound of catalyst. The averages are given in Table II.

TABLE II

| | Arabian Vacuum Resid Feedstock 800° F., 0.8 LHSV Average for 0.4 to 2.0 bbls of oil per lb of catalyst (~4th to the 22nd Day on Stream) | | | | |
|---|---|---|---|---|---|
| | | % Reduction | | | |
| | Vol % Conv. | Wt % CCR | Wt % S | Wt % N | Wt % Ni + V |
| Catalyst A | 38 | 33 | 56 | 14 | 66 |
| Δ¹ | 4 | 6 | 9 | 2 | 6 |
| Catalyst B | 42 | 39 | 65 | 16 | 72 |
| Δ¹ | 7 | 13 | 19 | 15 | (3) |

TABLE II-continued

| | Arabian Vacuum Resid Feedstock 800° F., 0.8 LHSV Average for 0.4 to 2.0 bbls of oil per lb of catalyst (~4th to the 22nd Day on Stream) | | | | |
|---|---|---|---|---|---|
| | | % Reduction | | | |
| | Vol % Conv. | Wt % CCR | Wt % S | Wt % N | Wt % Ni + V |
| Catalyst C | 45 | 46 | 75 | 29 | 63 |

¹Δ's are versus Catalyst A

EXAMPLE 4

The test procedure described in Example 2 was used to test catalysts A and D described in Example 1.

Catalysts A and D were tested at a temperature of 770° F. and a LHSV of 0.5 for eleven days. The temperature and the LHSV were then raised to 800° F. and 0.8 LHSV. The test run was continued for four days at those conditions, then terminated.

At both sets of test conditions, the results show that Catalyst D, which has a much lower macropore volume (volume in pores greater than 250 Å) than Catalyst A, is much more active than Catalyst A for conversion, Conradson carbon reduction, sulfur reduction and nitrogen reduction. Catalyst D, however, was less active for Ni+V reduction.

Figure 6:
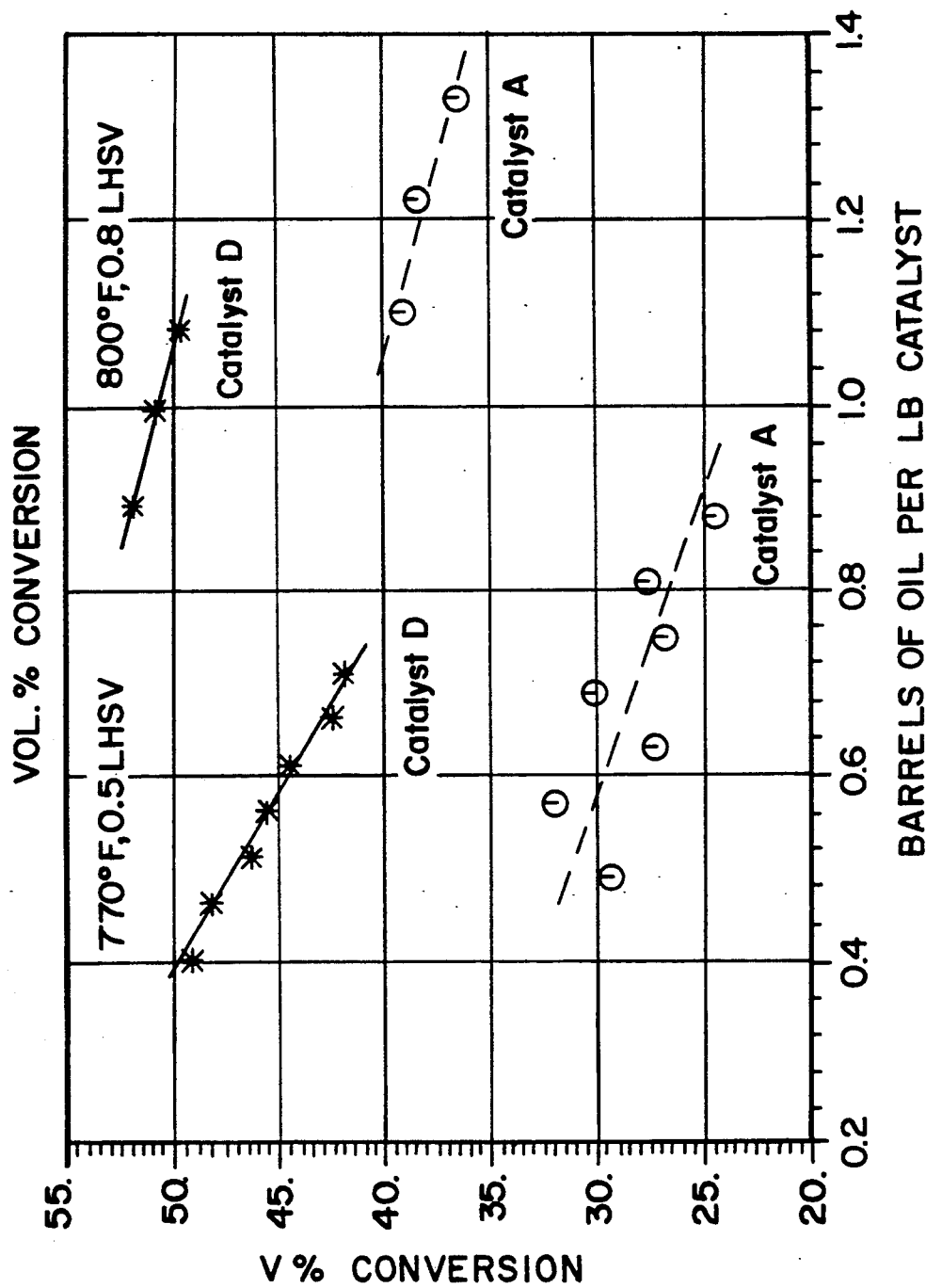
Figure 7:
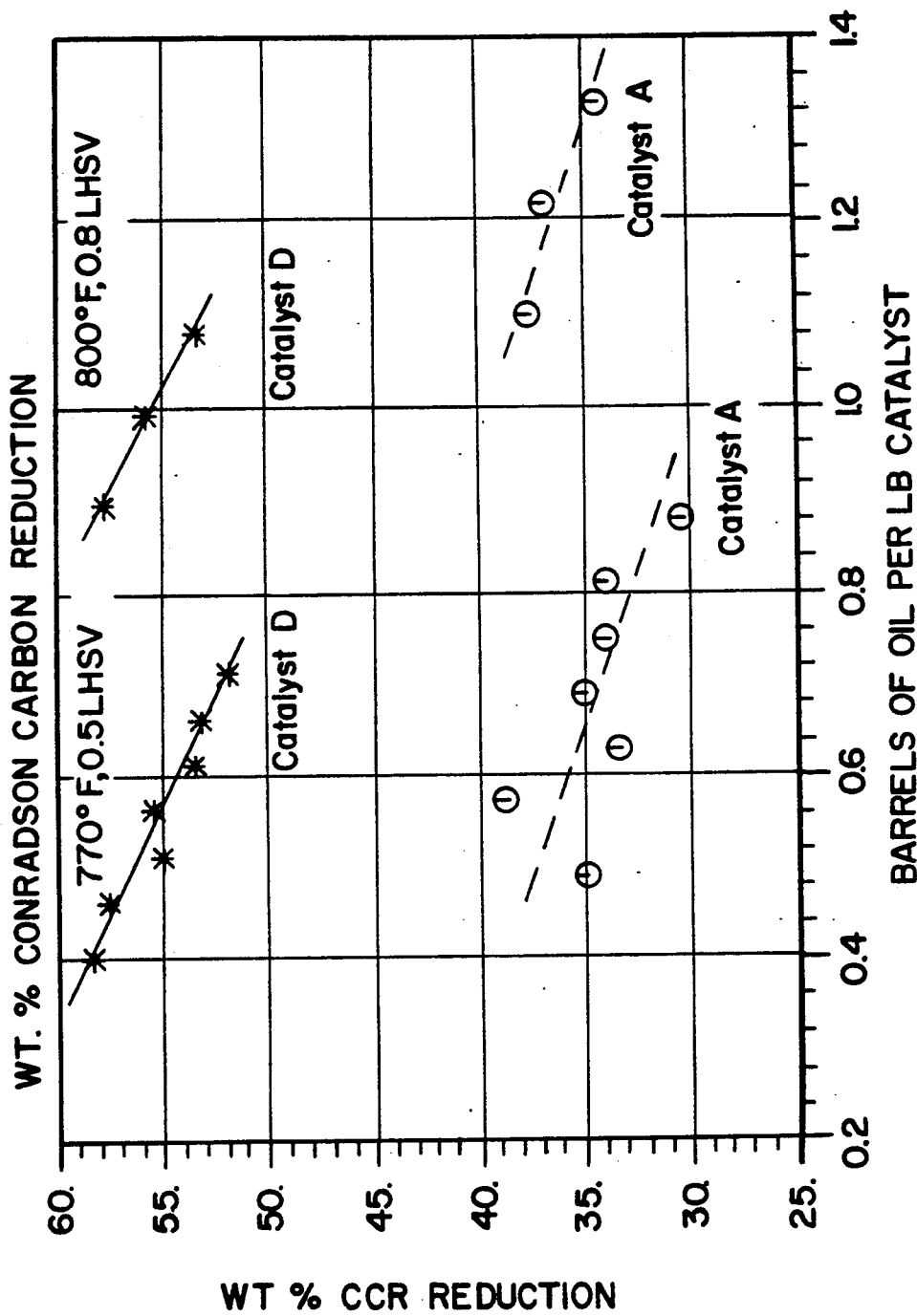
Figure 8:
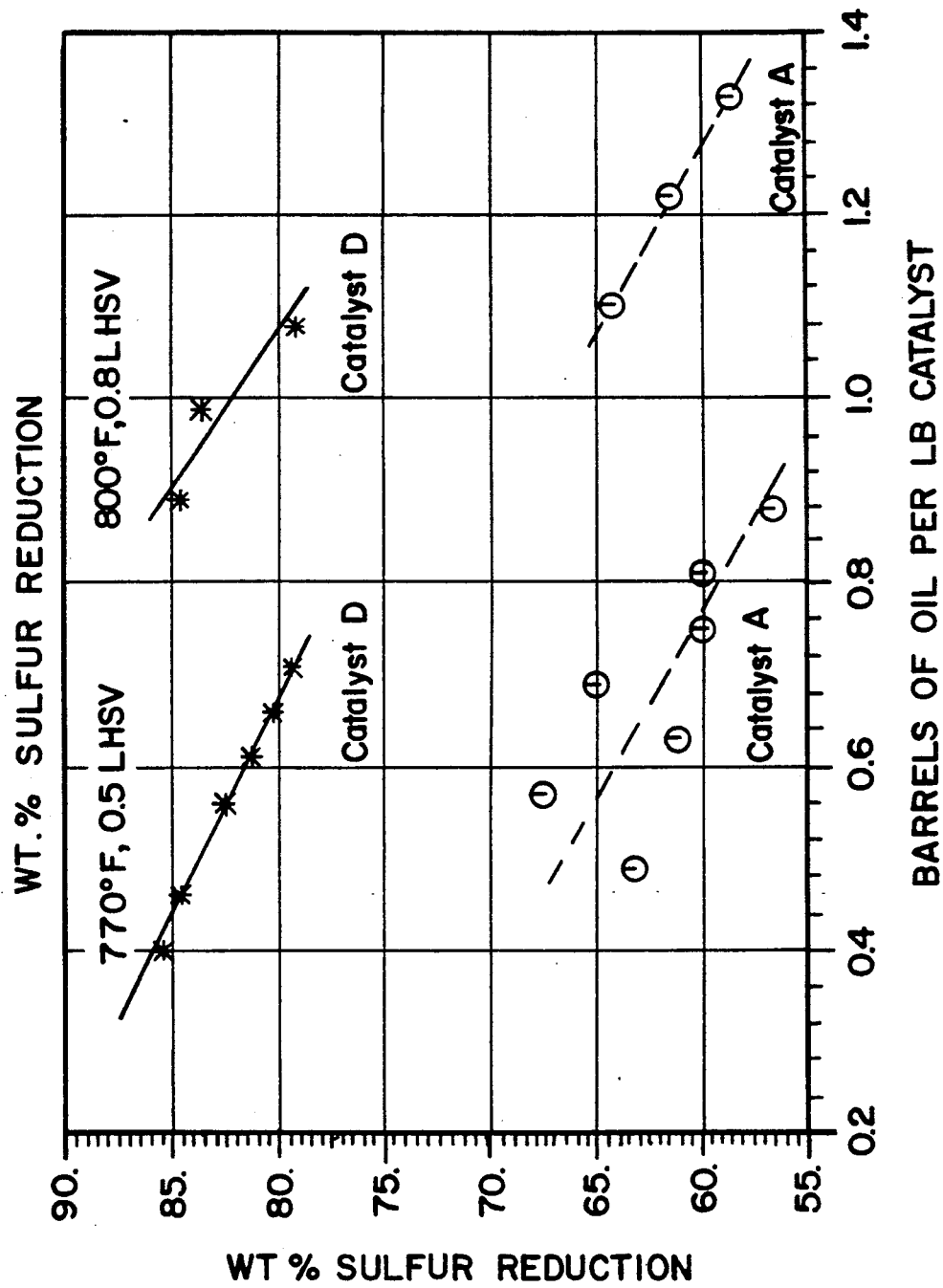
Figure 9:
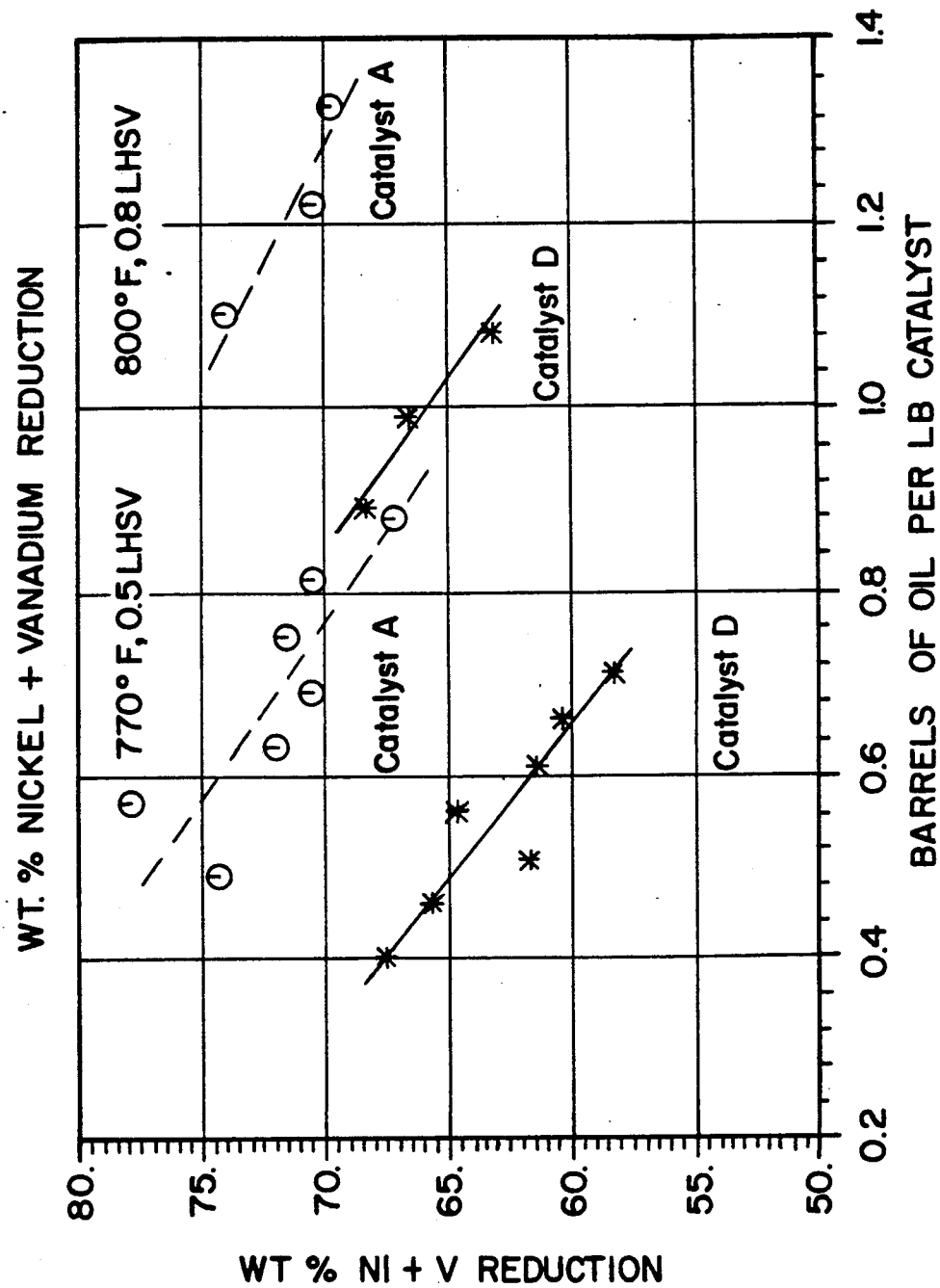

The test results are shown in FIGS. 6 through 9 as a function of barrels of oil (feedstock) per pound of catalyst. (N₂ Reduction Data not plotted.) Additionally, the data in FIGS. 6 through 9 were averaged for the range of 0.4 to 0.9 barrel of oil (feedstock) per pound of catalyst at 770° F. and 0.5 LHSV. The data was also averaged for the range of 0.9 to 1.3 barrels of oil (feedstock) per pound of catalyst at 800° F. and 0.8 LHSV. These averages are given in Table III.

TABLE III

| | Arabian Vacuum Resid Feedstock | | | | | | | | | |
|---|---|---|---|---|---|---|---|---|---|---|
| | 770° F., 0.5 LHSV Average for 0.4–0.9 bbl of oil per lb of catalyst (~5th to the 11th Day on Stream) | | | | | 800° F., 0.8 LHSV Average for 0.9–1.3 bbl of oil per lb of catalyst (~13th to the 15th Day on Stream | | | | |
| | | % Reduction | | | | | % Reduction | | | |
| | % Conv | CCR | S | N | Ni + V | % Conv | CCR | S | N | Ni + V |
| Catalyst A | 29 | 35 | 63 | 16 | 73 | 39 | 38 | 64 | 16 | 73 |
| | 14 | 18 | 18 | 26 | (13) | 11 | 15 | 15 | 19 | (10) |
| Catalyst D | 43 | 53 | 81 | 42 | 60 | 50 | 53 | 79 | 35 | 63 |

We claim:

1. A catalyst comprising alumina and catalytically effective amounts of a metal selected from the group consisting of a Group VIB metal and a Group VIII metal and mixture thereof, said catalyst having a surface area of greater than 330 m²/g, a total pore volume above about 0.5 cc/g as determined by mercury porosimetry, and less than 0.25 cc/g pore volume in pores greater than 250 Å diameter.

2. The catalyst of claim 1 wherein the surface area ranges from 330 to 380 m²/g.

3. The catalyst of claim 1 wherein the total pore volume ranges from 0.6 to 0.9 cc/g.

4. The catalyst of claim 1 wherein said metals are Mo and Ni.

5. The catalyst of claim 4 which contains 5 to 25 weight percent Mo and 0 to 10 weight percent Ni, expressed as the oxides.

* * * * *